United States Patent
Markus

[11] Patent Number: 5,107,981
[45] Date of Patent: Apr. 28, 1992

[54] DEVICE WITH FLOW MEDIUM STRATIFICATION FOR POSITIONING AND/OR TRANSPORTING UNIT LOADS

[75] Inventor: Meier Markus, Gächlingen, Switzerland

[73] Assignee: Robitron AG, Geringen, Switzerland

[21] Appl. No.: 455,394

[22] PCT Filed: Jun. 7, 1989

[86] PCT No.: PCT/CH89/00109
§ 371 Date: Feb. 2, 1990
§ 102(e) Date: Feb. 2, 1990

[87] PCT Pub. No.: WO89/12014
PCT Pub. Date: Dec. 14, 1989

[30] Foreign Application Priority Data
Jun. 9, 1988 [CH] Switzerland ............ 2203/88

[51] Int. Cl.⁵ ............................................. B65G 19/30
[52] U.S. Cl. .................................... 198/721; 198/733; 406/89
[58] Field of Search ............ 198/721, 731, 733; 414/676, 903; 406/86, 87, 88, 89

[56] References Cited

U.S. PATENT DOCUMENTS

| | | | |
|---|---|---|---|
| 3,052,339 | 9/1962 | Carter | 198/721 X |
| 3,382,965 | 5/1968 | Pierce et al. | 198/733 X |
| 3,588,176 | 6/1971 | Byrne | 406/89 X |
| 3,594,149 | 10/1972 | Pickavance et al. | 198/721 X |
| 3,731,823 | 5/1973 | Goth | 406/88 |
| 3,827,547 | 8/1974 | Nixon | 198/721 |
| 4,236,851 | 12/1980 | Szasz | 406/86 X |
| 4,280,782 | 7/1981 | Stumpf | 406/89 X |

Primary Examiner—Joseph E. Valenza
Assistant Examiner—Tuan N. Nguyen
Attorney, Agent, or Firm—Herbert Dubno

[57] ABSTRACT

The device disclosed comprises a support surface for unit loads, on which a load-bearing flow medium cushion, in particular an air cushion, can be constructed. Passages in the support surface communicate through a channel with a pressure source for the flow medium. At least part of the support surface consist of a body permeable to the flow medium and made of a sintered material, and which is inserted in the passages which can be connected through the channel to the pressure source.

2 Claims, 1 Drawing Sheet

DEVICE WITH FLOW MEDIUM STRATIFICATION FOR POSITIONING AND/OR TRANSPORTING UNIT LOADS

CROSS REFERENCE TO RELATED APPLICATION

This application is a national phase of PCT/CH89/00109 filed 7 June, 1989, and based upon Swiss national application 2203/88 filed 9 June, 1988, under the International Convention.

The present invention relates to a device with flow medium stratification for the positioning and/or transport of unit loads, particularly flat unit loads, wherein a flow-medium cushion, particularly an air cushion; can be built up over a support surface for the piece goods, passages in the support surface communicating through channels with a pressure source for the flow medium.

BACKGROUND OF THE INVENTION

Devices of the above-mentioned type are advantageously used for a gentle and noncontact positioning or moving of sensitive goods, such as paper webs or glass plates, records and CDs, but also silicon plates for semiconductors and the like.

Therefore, the passages provided in the support surface and as a rule, in flow connection with a compressed air source, are nozzles which compress the air underneath the piece good, the latter being then kept in suspension by the air.

Thereby, particularly where large surfaces are concerned, a large number of nozzles is required, leading to a high cost of the installation and a high consumption of flow medium.

Besides, if such systems are used in a so-called clean room, wherein from the ceiling a weak, downwardly directed air stream is constantly maintained in order to keep down the dust and the like, counterproductive air turbulence can occur, due to the punctiform exit of the air from the nozzle.

OBJECT OF THE INVENTION

It is therefore the object of the present invention to create a device of the aforementioned kind, which allows for a "gentle" air-cushion buildup.

SUMMARY OF THE INVENTION

According to the invention, this object is attained in that at least one portion of the support surface consists of bodies made of a flow-medium permeable sintered material, these bodies being inserted in the passages connectable to the pressure source via channel means.

These measures taken according to the invention allow the exit of a relatively large air flow on the upper side of the support surface, without the point blasting effect, whereby a vertical surface flow is created without materially influencing the existing flow conditions, leading to a quasi-static air cushion, appropriate for any size of the article supported.

The selection of the sintered material, which may be carbon, ceramic or the like, of the size of the flow-permeable bodies, of their density per surface unit, as well as the selectable flow pressure allow an optimal adjustment of the quasi-static air cushion to any use.

For an article of a smaller area, such as CDs or trays (platforms) supporting small articles or the like, the support surface with the flow-medium permeable bodies of sintered material form channel-like guide tracks with lateral borders.

It is important to create an effective advance of the piece good.

If this advance is created in the usual manner through advance nozzles located in the lateral borders, the installation is not suitable for clean rooms, for the aforementioned reasons.

If belt conveyors with centrally arranged entrainment means are used, considerable difficulties result in connection with an accumulation of the usually highly sensitive articles.

Therefore, a suitable development of the mentioned device can be considered the arrangement wherein the support surface is a part of the guideway of an accumulation conveyor and is pentrated by at least one dragging conveyor slit, through which entrainment means extend, each of them embracing on the belt side at least three roller or cylinder bodies arranged in the direction of travel, succeeding one another at equal distances and height-staggered with respect to each other, the roller or cylinder bodies being each partially wrapped by the belt and forming with the belt a slip drive for the entrainment means.

As a result, the articles carried by the air cushion have a secure entrainment connection with the endlessly running belt up to the accumulation point, where they stop due to the slip between belt and entrainment means.

Due to the relatively uncomplicated measures taken for this slip drive, it is practically possible to vary at will the slippage, respectively the holding force and to adjust them to the existing conditions, through the selection of the lateral distance between the rollers or cylinders and/or of their surface structure.

In order to avoid the transmission of the impact pressure by the piece goods, it is advantageous to provide stop means on the entrainment means, which cooperate with the neighboring entrainment means in maintaining the distance.

BRIEF DESCRIPTION OF THE DRAWING

Embodiments of the invention are described with the aid of the accompanying drawing, in which.

Figure 1:
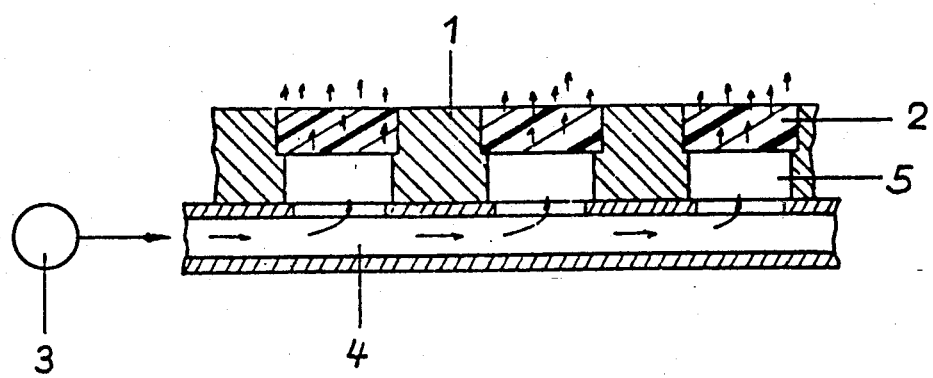
FIG. 1 is a longitudinal section through the support surface of a device with flow medium stratification for piece goods.

The device with flow medium stratification for the positioning and/or transport of piece goods, particularly flat articles, comprises a support surface 1 for the piece goods and has passages 5 which are in flow connection with a pressure source of the flow medium, usually air, via channel means 4.

It is essential for the invention that at least one portion of the support surface 1 be formed by flow-medium permeable bodies 2 made of sintered material, which bodies 2 are inserted in the passages 5 connectable over channel means 4 with the pressure source 3.

Thereby, an air discharge over a relatively large area on the top side of the support surface is possible, resulting in a superficial, vertical air current which forms a quasi-static air cushion.

The choice of the sintered material, such as carbon, ceramic and the like, of the side of the flow-medium permeable bodies 2, the density of the arrangement surface unit and the selectable flow pressure allow thereby an optimal adjustment of the static air cushion to any use.

Figure 2:
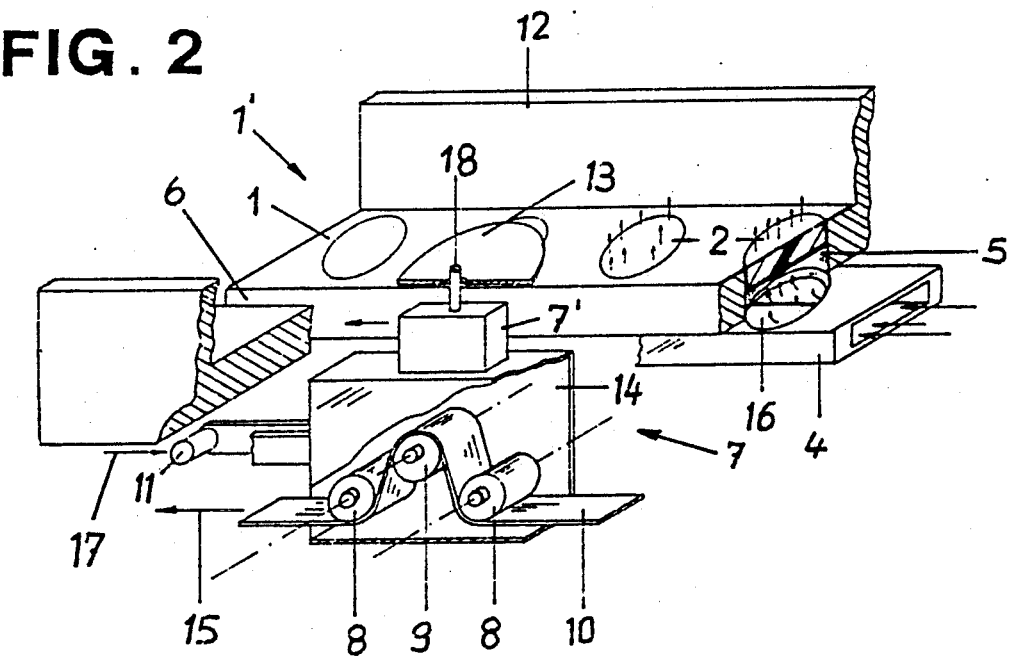
FIG. 2 is a schematic perspective view of the device according to the invention in the form of an accumulation-type conveyor, partly broken away.

For instance, a type of such use can be seen from FIG. 2.

This figure shows an accumulation-type conveyor, wherein the support surface 1 is a part of the guideway 1' with lateral guides 12 and serves for the transport of CDs, for example.

Through the middle of the guideway 1, a dragging conveyor slit 6 extends, for the longitudinal guiding of a plurality of continuously running entrainment means 7 (only one such entrainment means is shown).

Each entrainment means can thereby be guided with a flat guide piece 7' in the dragging conveyor slit 6, or can be supported on guides via rollers (not shown), so that the entrainment means can run unimpaired with the system along the conveyor path.

Each entrainment means 7 continues on the belt side preferably with a chassis 14, which here carries three roller respectively cylinder bodies 8 and 9, succeeding one another at equal distances in the travel direction of arrow 15 and are height staggered with respect to each other. These roller respectively cylinder bodies 8 and 9, which can be freely revolving or nonrotational, are each partially wrapped by a belt 10 and form together a slip drive for the entrainment means 7, whereby the belt is as a rule driven as an endless belt, which is known per se and requires no further explanation.

As mentioned, the entrainment means 7 move highly sensitive CDs 13, which here float on an air cushion over the support surface 1 of the guideway 1'.Therefore, according to the embodiment example of FIG. 1, one portion of the support surface 1 consists again of flow-medium permeable bodies 2 made of a sintered material, these bodies 2 being inserted in passages 5 which via openings 16 are in flow connection with the pressure channel 4 for the floor medium, e.g. air.

Thereby, it is also possible to provide such air-exit openings in the lateral guides 12 (not shown), in order to create lateral air cushions to prevent the piece goods from hitting the lateral guides 12.

In order to prevent an immediate overrun of the piece goods 13 in case of jamming, each entrainment means 7 is provided with a stop means 11 for maintaining the distance, which cooperates with the forerunning entrainment means 7.

If, as a result of accumulation at the stop means 11, an increasing impact pressure is generated, as indicated by arrow 17, the belt 10 continues to travel in the direction of the arrow 15, as a result of the slip between belt 10 and rollers 8 and 9, while the respective entrainment means 7 and the CD 13 moved therewith via for instance pin 18 stops.

From the preceding description a device results which is not only capable to produce practically a quasi-static air cushion with minimal air consumption, but which can also be used as an accumulation-type conveyor in so-called clean rooms.

I claim:

1. An apparatus with flow medium stratification for the transport of articles comprising:
    a support surface for the articles forming a load-bearing flow medium cushion, at least one portion of the support surface consisting of flow-medium permeable bodies made of a sintered material, said bodies being inserted in passages for a flow medium;
    a pressure source for the flow medium;
    channel means connecting said passages with the pressure source;
    a guideway of an accumulation-type conveyor and penetrated by at least one dragging conveyor slit said support surface forming part of said guideway;
    entrainment means for displacing said articles and extending through said slit and having on a belt side at least three roller bodies succeeding one another at equal distances in a travel direction and height-staggered with respect to each other, each roller body being partially wrapped by an endlessly running belt arranged underneath the guideway and forming with the belt a slip drive for the entrainment means.

2. An apparatus according to claim 2, wherein the entrainment means are provided with stop elements.

* * * * *